Jan. 27, 1959  J. E. HAWKINS ET AL  2,871,473
RADIO LOCATION SYSTEM

Filed Jan. 3, 1956  2 Sheets-Sheet 1

Inventors
JAMES E. HAWKINS
and LEWIS E. GARRETT
by
Attorneys

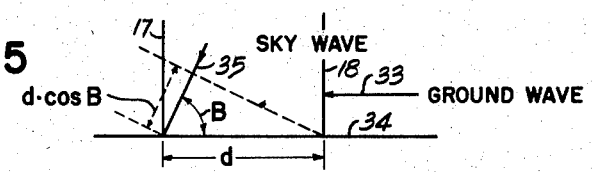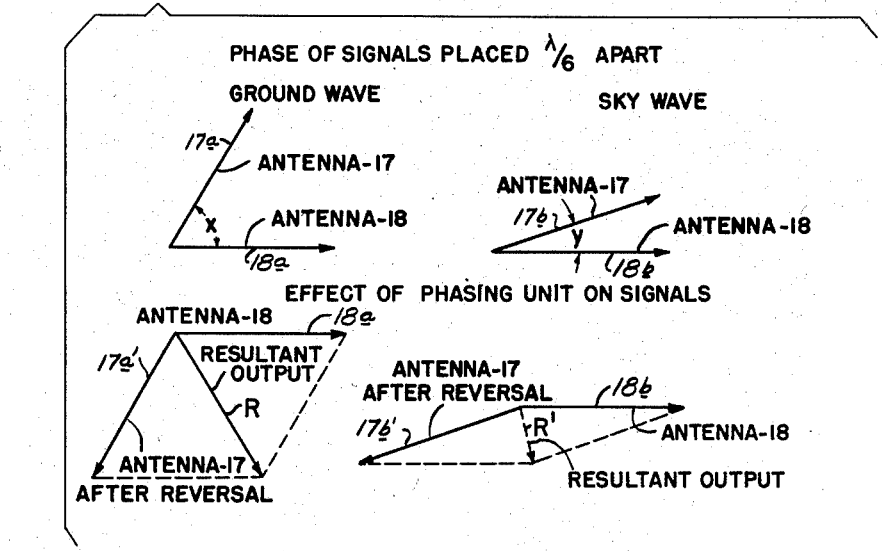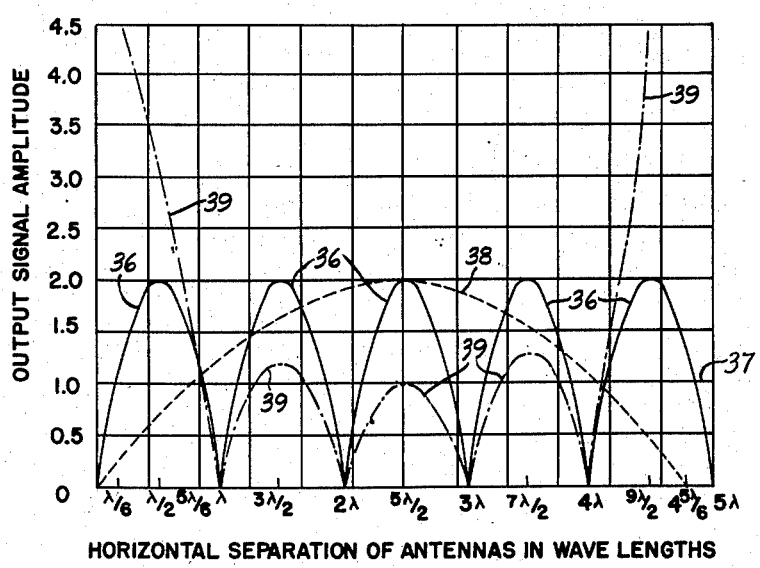

United States Patent Office 2,871,473
Patented Jan. 27, 1959

2,871,473

RADIO LOCATION SYSTEM

James E. Hawkins, Broken Arrow, and Lewis Eugene Garrett, Tulsa, Okla., assignors to Seismograph Service Corporation, Tulsa, Okla., a corporation of Delaware Application January 3, 1956, Serial No. 556,936

18 Claims. (Cl. 343—105)

The present invention relates generally to radio location and distance determining systems and relates more particularly to improvements in radio position finding systems of the hyperbolic, continuous wave type employing phase comparison in pairs of position indicating signals radiated from a plurality of spaced transmitting points to provide one or more indications from which the position of a mobile receiving point relative to the known positions of the transmitting points may be determined with precision accuracy.

In systems of the particular type referred to, the continuous waves radiated from each pair of transmitters bear phase relationships which change as a function of changing position of a receiving point moving within the field of the two transmitting points. More specifically, the phase relationships between the waves radiated by each pair of transmitting units of the system are characterized by isophase lines which are hyperbolic in contour about the transmitting points as foci. With this system arrangement, the position of a receiving point relative to a pair of hyperbolic isophase lines may be determined by measuring the phase relationship between waves radiated from the pairs of transmitters. Since the point of location of the receiving point along the zone separating the two isophase lines is not indicated by such a phase measurement, it is desirable to employ at least three spaced transmitters, different pairs of which function to provide a grid-like pattern of intersecting hyperbolic lines, in order to obtain an absolute determination of the position of the receiving point.

In U. S. Patent No. 2,148,267 to Honore, a system is disclosed in which the carrier waves of each pair of transmitters are heterodyned at a fixed link transmitting point and the difference frequency component of the heterodyned waves is modulated as a reference signal upon the carrier wave output of a link transmitter for radiation to the receiving point, where the difference frequency component is detected and phase compared with a difference frequency signal derived by directly heterodyning the transmitted continuous waves at the receiving point. In this manner, phase shifts between the continuous waves radiated from the two transmitters are completely compensated so that the measured phase angle is truly representative of the location of the receiving point between a pair of isophase lines. In U. S. Patent No. 2,517,317 to Hawkins and Finn, an improved system is disclosed wherein a pair of transmitters are alternately operated as link transmitters and as position signal transmitters thereby reducing the number of frequency channels required.

In all of the above described systems, however, difficulties may arise due to the fact that the reference signal transmitter at the link transmitting point must be located closely adjacent the receiver or receivers at the link transmitting point which are employed for heterodyning the waves radiated from other transmitting points in order to produce beat frequencies which constitute or may be used to produce the reference signals. Even though the reference signal transmitter is operating at a carrier frequency different than the frequencies to which the adjacent receivers are tuned, this frequency difference is limited by the number of frequency channels available, and, consequently, the wave radiated by the reference signal transmitter may introduce energy into the receiver circuits to block the receivers or produce cross modulation in the mixer stage thereof which results in objectionable spurious frequencies in the receiver output circuits.

Another problem encountered in the operation of systems of the character described above is the presence at each of the reference receivers adjacent the link transmitters of undesired sky waves occurring as a result of carrier wave radiation by the spaced transmitters. It is essential that the beat frequency signals developed by each reference receiver result solely from the heterodyning of ground waves radiated from two of the distant transmitters which ground waves are displaced upon arrival at the reference receiver by a fixed phase difference due to the fact that each of these waves traverses a constant distance in its path of travel from the transmitters to the receiver. Frequently, however, sky wave signals from the distant transmitters arrive at the reference receiver with sufficient amplitude to interfere with the simultaneously arriving ground wave signals thereby to produce phase discrepancies or phase shifts in the radiated reference signal which vary with the height of the reflecting layer. As a result, the reference signals detected at the mobile receiving point are of varying phase and produce misleading as well as inaccurate position indications.

In copending application of Robert S. Finn, Serial No. 454,983, filed September 9, 1954, now Patent No. 2,828,-485 issued March 25, 1958, and assigned to the same assignee as the present invention, there is disclosed an arrangement for effectively solving the problems discussed above by employing a pair of vertically spaced antennas adjacent to but spaced substantially equidistant from the link transmitting station. In the system disclosed in the latter application, a phasing unit is employed to balance out the signals received by the antennas from the adjacent link station and to attenuate severely the sky waves arriving from the remote stations while, at the same time, passing the desired ground wave signals from the remote stations to the reference receiver to perform their intended functions. However, the flexibility of this system is somewhat limited due to the fact that the antennas must be spaced substantially equidistant from the link station in order to obtain the desired balancing out in the phasing unit. In many installations, particularly in swamp lands or areas partially covered with water, it is difficult to find sites for the vertical antennas which will satisfy all of the requirements of the system disclosed in the Finn application. Moreover, the equipment associated with the antennas, such as the antenna connections, the antenna couplers and matching units and the like, frequently introduces phase and amplitude differences in the signals passed from the antennas to the phasing unit. The limited degree of adjustability of the phasing unit in the Finn system sometimes makes it difficult to eliminate these phase and amplitude differences as must be done if the undesired signals are to be balanced out.

One of the principal objects of the present invention is, therefore, to provide an improved radio location system of the above indicated type which is free of all of the described disadvantages.

It is also an object of the present invention to provide improved radio location systems of the above indicated type in which a reference signal transmitter may be operated closely adjacent to receivers at a link transmitting point.

It is further an object of the invention to provide an improved radio location system of the continuous wave type which is free of phase synchronization difficulties of the character mentioned and in which interference of the reference signal transmitter with the receivers at the link transmitting unit is eliminated or minimized.

Another object of the invention is to provide an improved radio location system in which sky wave interference at the receivers adjacent the link transmitter is eliminated while at the same time minimizing or eliminating entirely the adverse effects at the reference receiver normally attendant upon the radiation of signals from an adjacent link transmitter.

It is still another object of the present invention to provide an improved transmission system for use in radio location systems of the continuous wave type in which the signal radiated by a link transmitter does not interfere with the operation of a closely adjacent reference receiver and in which sky waves arriving at the reference receiver are attenuated in order to prevent the introduction of phase discrepancies into the reference signals developed by the receiver.

It is likewise an object of the invention to provide, in a transmission system used in radio location systems of the continuous wave type, an improved phasing unit for use with receiving equipment operated closely adjacent a link transmitter in order to eliminate interference at the reference receiver from received sky waves and from the radiation of signals by the link transmitter.

The invention, both as to its organization and method of operation, together with further objects and advantages thereof, will best be understood by reference to the specification taken in connection with the accompanying drawings in which:

Fig. 1 diagrammatically illustrates a three foci hyperbolic continuous wave transmitting system employing a center transmitting station and a pair of end transmitting stations each of the latter having associated therewith receiving equipment embodying the present invention;

Fig. 2 diagrammatically illustrates a three foci hyperbolic continuous wave transmitting system employing three spaced transmitters and a separate link transmitting station characterized by the features of the present invention;

Figure 3:
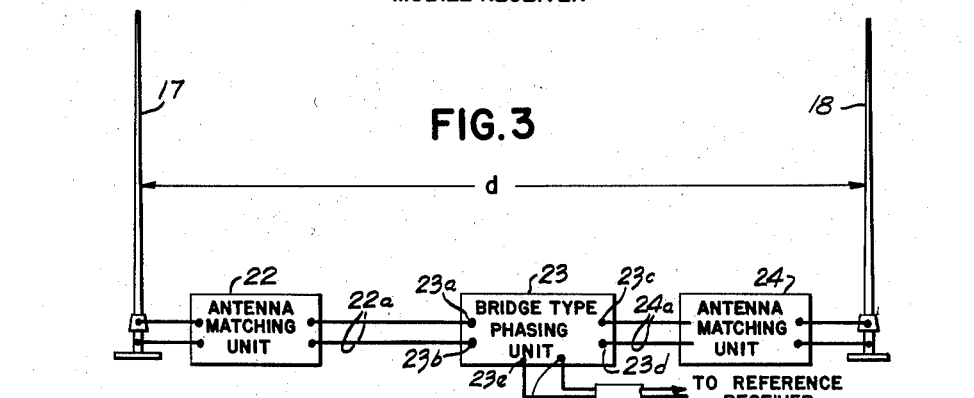
Fig. 3 illustrates in block diagram form a receiving antenna array and its associated equipment which form part of the apparatus illustrated in Figs. 1 and 2.
Figure 4:
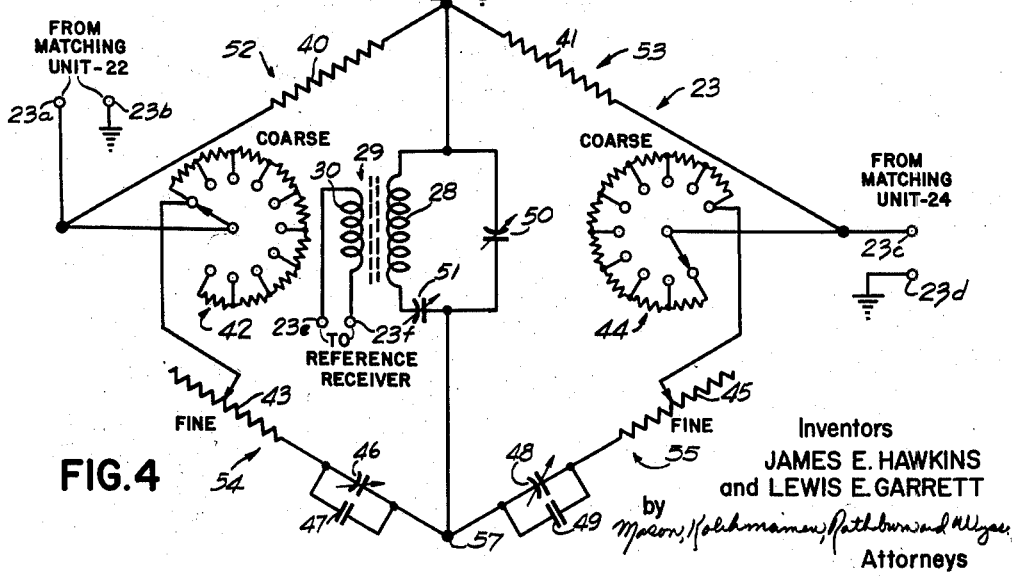
Fig. 4 is schematic representation of the phasing unit of the equipment shown in Fig. 3.

Fig. 5 diagrammatically illustrates the different effects of received ground and sky waves upon the antenna array depicted in Fig. 3;

Fig. 6 shows a series of vector diagrams illustrating the phase relationship between the sky waves and ground waves collected by the antennas shown in Fig. 3 and also illustrating the effect of the phasing unit shown in Fig. 4 upon these waves; and Fig. 7 is a graph illustrating the effect of the spacing of the antennas in the array shown in Fig. 3 upon the amplitude of signals fed to the receiving equipment associated with this array.

Figure 1:
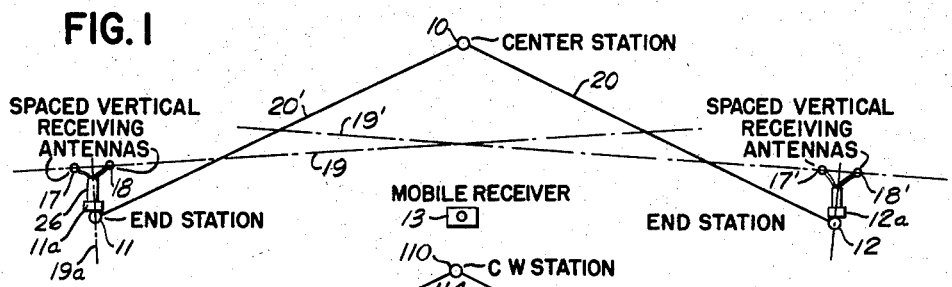

Referring now to the drawings and more particularly to Fig. 1 thereof, the present invention is there illustrated as embodied in a three foci, hyperbolic, continuous wave type transmitting system employing three spaced, continuous wave transmitters 10, 11 and 12 for providing position indications at any number of mobile receiving units 13 carried upon vessels or vehicles operating within the radiation field of the transmitting system. The transmitting and receiving system illustrated in Fig. 1 is disclosed and claimed in United States Patent No. 2,513,317 to James E. Hawkins and Robert S. Finn, assigned to the same assignee as the present invention, and, accordingly, a detailed description of this system will not be made herein. Briefly, however, the transmitters 11 and 12 each radiates continuously a carrier wave of radio frequency which during alternate intervals of operation is modulated with a reference signal of audio frequency thereby alternately to convert each of these transmitters for operation as a link transmitter. The center transmitter 10, on the other hand, functions alternately to radiate first one and then another of two distinguishable carrier wave signals.

During the interval of operation when the center transmitter 10 is operative to radiate the first of its two carrier wave signals, a reference receiver 11a associated with the end transmitter 11 heterodynes this signal with the carrier wave continuously radiated by the end transmitter 12 with the result that a beat frequency signal is generated. This beat frequency signal modulates the carrier wave continuously radiated by the end transmitter 11 and, accordingly, during the described interval of operation, this particular transmitter functions as a link transmitter.

During this same interval of operation, the receiving equipment at the mobile receiver unit 13 collects the two unmodulated carrier waves respectively radiated by the transmitters 10 and 12 together with the modulated carrier wave radiated by the end transmitter 11. The reference signal modulated upon the wave received from the latter transmitter is reproduced. At the same time, the unmodulated waves received from the transmitters 10 and 12 are heterodyned to create a beat frequency signal for phase comparison with the reproduced reference signal, thereby to provide a position indication representative of the location of the mobile receiver unit along a hyperbolic isophase line having faci at the positions of the transmitters 10 and 12. From the foregoing explanation, it will be apparent that during this particular interval of operation the transmitters 10 and 12 both function to radiate position indicating signals whereas, as previously indicated, the end transmitter 11 functions as a link transmitter.

At the end of the above described transmitting interval, switching mechanism (not shown in Fig. 1) at the center transmitter 10 terminates the radiation of the first carrier wave signal and initiates operation of the center transmitter to radiate its second carrier wave signal. The reference receiver 12a associated with the end transmitter 12 heterodynes the latter signal with the carrier wave radiated by the end transmitter 11 in order to produce a beat frequency signal for modulating the carrier wave radiated by the end transmitter 12. As a result, during this particular interval of operation, the end transmitter 12 functions as a link transmitter.

The modulated carrier wave radiated by the end transmitter 12 is received at the mobile receiver unit 13 and the reference signal appearing as a modulation component thereon is reproduced. The receiving equipment at the mobile receiver unit 13 also heterodynes the carrier wave continuously radiated by the end transmitter 11 with the wave radiated from the center transmitter during this interval of operation in order to produce a beat frequency signal. The phase relationship between the resulting beat frequency signal and the reproduced reference signal is measured in order to provide a position indication representative of the location of the mobile receiver unit 13 along a hyperbolic isophase line having foci at the positions of the transmitters 10 and 11. From the foregoing explanation, it will be apparent that, during the interval just described, the transmitters 10 and 11 function to radiate position indicating signals while, as indicated above, the end transmitter 12 functions as a link transmitter.

The intersection of the two isophase lines identified during the separate intervals of operation of the center transmitter 10 establishes a position fix indicative of the precise location of the mobile receiver unit 13 with respect to the fixedly positioned transmitters 10, 11 and 12. The problems attendant upon the cyclic ambiguity of the system described above may be solved in any manner known in the art as, for example, by the system described in the Patent No. 2,652,561 to James E. Hawkins, assigned to the same assignee as the present invention.

From the foregoing description, it is apparent that the accuracy of the phase indications provided at the mobile receiving unit depends upon the reception of reference signals from the link transmitters, i. e. the end transmitters 11 and 12, which are developed at the reference receivers 11a and 12a by heterodyning waves having constant path lengths between their sources and the locations of the receivers. This condition will be satisfied as long as the reference receivers 11a and 12a heterodyne only the ground waves radiated by the transmitters 10, 11 and 12 due to the fact that each of these ground waves traverses a constant distance between its source and the location of the reference receiver. However, as previously indicated, the waves radiated from the transmitters 10, 11 and 12 are sometimes reflected from a layer located at some distance above the earth's surface and the resulting sky waves frequently arrive at the reference receiver simultaneously with the ground waves. If these sky waves are not eliminated it is apparent that they will be heterodyned by the reference receivers 11a or 12a either with other sky waves or with the simultaneously arriving ground waves and, as a result, phase shifts or phase discrepancies will appear in the reference signals modulated upon the carrier waves radiated by the end transmitters 11 and 12. The reference signals reproduced by the mobile receiver unit 13 will exhibit these phase shifts or discrepancies with the result that inaccurate position indications will be obtained.

In operation of a system of the type illustrated in Fig. 1, the reference receivers 11a and 12a are preferably located at points closely adjacent the end transmitters 11 and 12, respectively, in order to avoid the use of excessively long cables or transmission lines. Such cables or lines are not only very expensive but in many locations such as marsh land or heavily wooded areas their use is practically impossible due to the difficulties involved in their installation and maintenance. However, while the operation of each of the reference receivers in proximity to its associated transmitter is highly desirable, such operation introduces the problems mentioned above with respect to receiver blocking and the production of undesired spurious responses.

In accordance with the present invention, both sky wave interference and the problems attendant upon operation of the reference receiver near its associated transmitter are eliminated by providing at each of the reference receivers equipment of the type illustrated in Fig. 3 including a pair of spaced vertical antennas or receptors. The antennas associated with the reference receiver 11a are designated by the reference numerals 17 and 18 and, as shown in Fig. 1, are preferably but not necessarily aligned along an imaginary base line indicated at 19 which bisects an imaginary base line 20 interconnecting the points of location of the transmitters 10 and 12. Similarly, the antennas 17' and 18' associated with the reference receiver 12a are preferably aligned along base line 19' which bisects the base line 20' interconnecting the points of location of the transmitters 10 and 11 in order to effect the maximum reception of signals radiated from these two transmitters.

Identical equipment is associated with each pair of the antennas described above and, accordingly, to simplify the explanation, only the equipment associated with the antennas 17 and 18 is illustrated in Fig. 3. As indicated previously, the purpose of this equipment is to eliminate the ground wave radiated from the end transmitter 11 in order to prevent blocking of the reference receiver, while, at the same time, minimizing the sky waves arriving from the transmitters 10 and 12. To this end, the signals collected by the antenna 17 are fed through an antenna matching device 22 to signal input terminals 23a and 23b of a phasing unit 23 while the signals from the antenna 18 are fed through an antenna matching device 24 to signal input terminals 23c and 23d of this phasing unit. The antenna matching devices 22 and 24 are of conventional construction and serve to match the impedances of the antennas 17 and 18 with the characteristic impedances of transmission lines 22a and 24a, respectively, in order to provide maximum energy transfer between each of the antennas and the phasing unit.

The phasing unit, as described hereinafter, effectively reverses the phase of the signal from one of the antennas and then vectorially adds the resulting signal to the signal from the other antenna in order to provide across output terminals 23e and 23f a combined signal for application over a relatively short transmission line 26 to suitable input terminals of the reference receiver 11a. While all of the components of the reference receiver 11a have been schematically shown in the drawings as being located at the transmitter site, it may be desirable in some cases to mount the receiver R. F.-I. F. strip adjacent to or on the same chassis with the phasing unit 23 and to send only the signal output of the I. F. strip over the transmission line 26. Moreover, if desired, a radio frequency filter may be inserted between the phasing unit 23 and the R. F. strip of the reference receiver to eliminate interfering radio frequency signals such, for example, as the carrier wave radiation from transmitters of another radio position finding system being operated in the vicinity of the system shown in Fig. 1. Such a filter has not been shown in the drawings since it is not at all necessary to the operation of the system. In effect, the phasing unit 23 constitutes a subtraction circuit wherein undesired signals arriving at the antennas 17 and 18 may be cancelled so that they do not appear between output terminals 23e and 23f and, conversely, desired signals arriving at the antennas may be passed to the reference receiver 11a. To this end, as shown in Fig. 4, the phasing unit comprises a four terminal bridge network having impedance arms generally indicated as 52 to 55, inclusive. The input terminals 23a and 23c of the bridge are respectively excited by the signals from antennas 17 and 18 with the terminals 23b and 23d being connected directly to ground. Terminals 56 and 57, of course, function as the output terminals of the bridge, the former being connected directly to ground and the latter being formed at the junction of bridge arms 54 and 55. Thus, the signals developed by antenna 17 and passed through the matching unit 22 are applied across arm 52 of the bridge consisting of a fixed resistor 40 while the signals developed by antenna 18 and passed through the matching unit 24 are applied across resistor 41 forming bridge arm 53. Arms 54 and 55 are similar and each preferably consists of a tapped variable resistance providing a coarse adjustment, a potentiometer providing a fine adjustment, and a variable reactance providing a phase shifting means. In the bridge arm 54 the tapped resistance is designated as 42, the fine adjusting potentiometer is designated as 43 and the variable reactance preferably comprises a variable capacitor 46 connected in parallel with a fixed capacitor 47, while corresponding elements in the bridge arm 55 are respectively designated 44, 45, 48 and 49. Obviously, if the bridge is balanced to any particular signal, no voltage will appear between terminals 56 and 57 as a result of this signal. If the bridge is unbalanced, however, an output is developed between terminals 56 and 57 for application across a tuned circuit consisting of the primary winding 28 of a transformer 29, a variable capacitor 50 and a trimmer capacitor 51. The secondary winding 30 of the transformer is connected directly across output terminals 23e and 23f of the phasing unit and functions to supply excitation signals to the input of reference receiver 11a.

Referring now to the manner in which signals radiated by each link transmitter are prevented from blocking its associated reference receiver, it will be recognized that the amplitudes of and the phase relationship between the signals as they appear upon the antennas 17 and 18 are a function of the alignment of the antennas or, more particularly, upon the distance between each of the antennas and the source of the waves at the end transmitter 11. Thus, for example, if the antennas are located equal distances from the end transmitter 11, the signals intercepted by the two antennas from this transmitter are in phase coincidence and are approximately equal in amplitude while, if the distances are not equal, both the phase and amplitude of the signals from transmitter 11 will be different. The signals from the transmitter 11 applied to the opposite sets of signal input terminals 23a—23b and 23c—23d of the phasing unit exhibit not only these phase and amplitude differences resulting from antenna spacing but are also affected by differences in the antenna connections and in the matching units 22 and 24. As previously mentioned, it is not always convenient to locate the antennas 17 and 18 at exactly equal distances from the transmitter 11 due to the topography in the vicinity of the latter transmitter or other conditions of this nature. However, with the bridge type phasing unit 23 illustrated in Fig. 4, the impedance bridge may be balanced to eliminate the undesired signals from the transmitter 11 despite the phase and amplitude differences mentioned above. Thus, the antennas 17 and 18 need not be located equal distances from the transmitter but may instead be positioned at locations most convenient to the particular transmitting site. Specifically, the impedance of the bridge arms 54 and 55 may be adjusted by varying the resistances and capacitors until the following relationship is established for signals arriving from the transmitter 11:

$$\frac{Z_{52}}{Z_{53}} = \frac{Z_{54}}{Z_{55}}$$

where $Z_{52}$ represents the impedance of bridge arm 52, $Z_{53}$ represents the impedance bridge arm 53 and so on. Under these conditions, the bridge is balanced and no signals appear between the output terminals 56 and 57 as a result of the waves received from the transmitter 11. As a consequence, the signals appearing across the output terminals 23e and 23f of the phasing unit do not include waves received from the link transmitter 11 and the reference receiver 11a is not disturbed by these waves.

Since the adjustable bridge arms 54 and 55 comprise both resistance and reactance components, an adjustment may be made to effect bridge balance even though the signals applied to the unit 23 are displaced somewhat in phase. The reactance components, i. e. capacitors 46 to 49, inclusive, vary the phase angle of the signals to compensate for the phase displacement of the input signals. In addition, any difference in amplitude between applied input signals may be compensated for by adjusting the relative impedances of arms 54 and 55. In any event, when the bridge is properly balance in the manner described above, the signals received from transmitter 11 are eliminated from the output of the phasing unit.

From the foregoing description, it will be apparent that the vertical antenna array cooperates with its associated equipment shown in Figs. 3 and 4 to permit operation of the reference receiver 11a at a point closely adjacent the end transmitter 11 without incurring the aforementioned difficulties with respect to receiver blocking and the introduction of spurious signals into the signal channels of the reference receiver. Moreover, with the described phasing unit 23, the location of the antennas 17 and 18 with respect to the transmitter 11 is not critical with the result that greater flexibility is provided in the selection of suitable sites for these antennas.

Turning next to the operation of the equipment shown in Fig. 3 to minimize the effect of sky wave interference, it will be recognized that all of the ground waves radiated from the transmitters 10, 11 and 12 are vertically polarized and, therefore, produce maximum excitation of both of the vertical antennas 17 and 18. The sky waves, on the other hand, are elliptically polarized and include both vertical and horizontal components. Since the vertical antenna is insensitive to horizontally polarized waves, the horizontal components of the sky waves will not appear on either of the antennas 17 or 18 but the vertical components of these sky waves will excite both of the antennas. In the system shown in Fig. 1, no sky waves will be received by the antennas 17 and 18 from the end transmitter 11 due to the fact that this transmitter is located only a short distance from the antennas and sky waves ordinarily appear only at relatively large distances from their source. Also, in many installations the center transmitter 10 will not be positioned at a point sufficiently remote from the reference receivers to create sky wave interference problems and, accordingly, the most serious sky wave interference at the reference receiver 11a will probably be induced by the radiation of carrier waves from the end transmitter 12. However, since sky waves may appear at each reference receiver from both the center transmitter and from the remote end transmitter, it will be assumed that the antennas 17 and 18 respond to both of these sky waves.

In order to illustrate the effect of the ground and sky waves upon the vertical antennas 17 and 18, these antennas are shown in Fig. 5 as being separated by a horizontal distance $d$ and are positioned to intercept both the ground waves radiated from the end transmitter 12 and the sky waves resulting from this radiation. As indicated above, the antennas 17 and 18 also intercept the ground and sky waves resulting from radiation by the center transmitter 10 although, to facilitate the description, the waves arriving from the latter transmitter have not been shown. The ground wave appearing at the two antennas as a result of carrier wave radiation from the end transmitter 12, as indicated by the arrow pointed line 33, follows a path which is closely parallel to the earth's surface 34 and intercepts the antenna 18 somewhat prior to its arrival at the antenna 17. These ground wave signals appearing at the two antennas are, therefore, of approximately equal amplitude but are displaced in phase by an amount, designated as $x$, which is a function of the spacing between the antennas. It will be apparent that the phase displacement between these signals is also a function of the alignment of the antennas with respect to the source of the ground wave at the end transmitter 12. The phase difference results from the difference in travel time of the ground wave from the end transmitter 12 to each antenna and, accordingly, if the antennas 17 and 18 were aligned along a base line passing through the source of the ground waves at the end transmitter, the phase displacement would be equal to $d/\lambda$, where $\lambda$ is equal to one full wave length of the received ground wave signal. For other alignments the amount of phase displacement will be somewhat less than $d/\lambda$.

In order to demonstrate the phase relationship between the ground wave signals from the transmitter 12 appearing at each antenna, these signals have been represented by suitable vectors in the vector diagram shown in the upper left hand corner of Fig. 6. Thus, in this diagram the ground wave signal from the transmitter 12 appearing on the antenna 18 is represented by a vector 18a which, as illustrated, leads by a phase angle $x$, the vector 17a representing the ground wave signal from transmitter 12 appearing on antenna 17.

The effect of the phasing unit 23 upon these two ground wave signals is illustrated by the vector diagram in the lower left hand corner of Fig. 6 wherein the signal from the antenna 17 has been reversed from the position described above and is represented by the vector 17a'. As previously described, this phase reversal results from combining the signals from the two antennas in the bridge circuit of the phasing unit. The phasing unit functions in the manner described above to add the vectors $17a'$ and $18a$ and produces a resultant output R across its output terminals $23e$ and $23f$. The magnitude of this resultant may be found in conventional manner by summing the horizontal and vertical components of the vectors $17a'$ and $18a$ shown in Fig. 6 and, if the lengths of the vectors $17a'$ and $18a$ are assumed to be equal to unity, this resultant may be expressed mathematically in terms of the signal from a single antenna as follows:

$$R^2 = (-\sin x)^2 + (1 - \cos x)^2$$
$$R = \sqrt{2} \cdot \sqrt{1 - \cos x} \quad (1)$$

The sky wave arriving at the two antennas from the end transmitter 12, as indicated by the arrow pointed line 35, arrives at a relatively large angle B with respect to the earth's surface. The magnitude of the angle B is a function of the height of the reflecting layer and of the horizontal distance between the receiving point and the source of the sky waves. As indicated in Fig. 5, the sky wave 35 intercepts the antenna 18 prior to its arrival at the antenna 17 with the result that the signals appearing on the two antennas as a result of the sky wave are displaced in phase by an amount, designated as $y$, which is a function of the spacing between the two antennas, the alignment of the antennas with respect to the end transmitter 12, and the angle of arrival B of the sky wave. As shown in Fig. 5, the phase difference $y$ exists as a result of the increased distance travelled by the sky wave in reaching the antenna 17, this distance being equal to $d \cos B$. In terms of phase, the difference in arrival of the signals at the two antennas may be expressed as $y = x \cos B$ in which $x$, as described above, represents the phase displacement between the received signals as a result of separation of the antennas.

The sky wave signals arriving at the antennas 17 and 18 from the end transmitter 12 are respectively represented in the vector diagram in the upper right hand corner of Fig. 6 by the vectors $17b$ and $18b$. When these signals are combined in the phasing unit 23, the vector $17b$ is effectively reversed in the manner previously described. The result of this phase reversal is portrayed in the vector diagram appearing at the lower right hand corner of Fig. 6 wherein the vector $17b$ has been rotated 180° to the position indicated by the vector $17b'$. The phasing unit 23 functions in the manner described above to combine the vectors $18b$ and $17b'$ in order to produce a resultant R' which may be expressed as:

$$R' = \sqrt{2}\sqrt{1 - \cos y}$$

or $$R' = \sqrt{2}\sqrt{1 - \cos(x \cos B)} \quad (2)$$

It will be observed that, in order to provide complete cancelaltion of the sky wave by the phasing unit, the two antennas 17 and 18 would have to be so spaced and aligned that the sky wave signals arrive exactly in phase, i. e. the quantity $(x \cos B)$ in Equation 2 above would be equal to $2\pi$ at which time the quantity $(d \cos B)$ would be equal to one full wave length of the signals received from the end transmitter 12 if the antennas 17 and 18 were aligned along a base line passing through the location of this transmitter.

If the reflecting layer is assumed to be 200 miles high and if the reference receiver $11a$ is assumed to be located approximately 85 miles from the end transmitter 12, the angle of arrival B of the sky wave will be arc tan 4.7 or approximately 78°. Thus, if the antennas 17 and 18 are directly aligned with the end transmitter 12, for complete sky wave cancellation:

$$d \cos 78° = \lambda$$

or $$d = 4.83\lambda$$

Accordingly, if the end transmitter 12 radiates signals having a frequency of approximately 1772 kilocycles, the two antennas must be spaced apart at least 2,680 feet in order to effect complete sky wave cancellation and, if the antennas are not aligned with respect to the end transmitter, as is generally the case, an even greater spacing will be required. In some installations the antennas may be spaced apart at this distance and an infinite ground wave to sky wave ratio will be realized at the output of the phasing unit. However, in many installations such a large spacing is impractical by virtue of the fact that it would involve the use of excessively long transmission lines between each of the antennas 17 and 18 and the phasing unit 23 and, at the same time, would considerably complicate the installation of the equipment.

However, it should be recognized that complete sky wave cancellation is not essential since, if the ratio of the ground wave amplitude to the sky wave amplitude is relatively high, the gain of the receiver circuits can be adjusted to render the reference receiver insensitive to small amplitude sky waves. Therefore, it becomes desirable to ascertain a practical spacing of the antennas 17 and 18 which will provide a large ratio between the ground wave signal and the sky wave signal appearing across the output terminals $23e$ and $23f$ of the phasing unit.

The effect of varying the antenna spacing upon the signals between terminals $23e$ and $23f$ due to the ground and sky waves will best be appreciated by reference to Fig. 7 wherein a plurality of graphs are shown representative of the amplitude of these waves. More specifically, the solid line curve, designated by the reference numeral 36 in Fig. 7, represents the amplitude of the ground wave signals appearing between terminals $23e$ and $23f$ as a function of thes pacing between the antennas 17 and 18. Thus, the amplitude of the signal output of the phasing unit is plotted as an ordinate of this curve with an amplitude of unity, indicated by the horizontal line 37, representing the magnitude of the ground wave signal which would be developed by a single vertical antenna positioned near the reference receiver $11a$. It should be observed that prior to the present invention a single antenna has been employed for collecting the signals applied to each of the reference receivers and, accordingly, these receivers are designed to function properly only when their signal input terminals are excited by signals of sufficient amplitude, i. e. when the amplitude of the ground wave signal is equal to or exceeds unity. Thus, it will be apparent that those regions of the ground wave curve 36 which lie below the horizontal line 37 fail to provide sufficient excitation for the reference receiver $11a$ and, as a result, it will be assumed in the present description that antenna spacings corresponding to these regions are not suitable. However, it will be recognized that, if desired, the gain of the receiver circuits could be increased within reasonable limits by a change in design, i. e. by the use of additional radio frequency amplifiers and the like, to provide proper receiver operation with decreased input signal amplitude.

It will be observed that the ground wave curve 36 is characterized by a complete elimination of the ground wave signal whenever the antennas 17 and 18 receive ground waves which are in phase coincidence. In order to simplify the explanation and to facilitate the construction of the curves, it has been assumed that the antennas 17 and 18 are aligned along a base line passing through the transmitter 12. Thus, complete elimination of the ground wave signals occurs when the antennas are separated by a distance corresponding to an integral number of wave lengths of the signal radiated by the end transmitter 12. Obviously, with the indicated antenna alignment, whenever the antennas are spaced an integral number of wave lengths apart, the ground waves appearing at each antenna are in phase coincidence and, as a consequence, these signals are cancelled by the phasing unit 23 in the manner described above. When the antennas are spaced apart a distance corresponding to one-half wave length, three half wave lengths, five half wave lengths, etc., of the signal radiated by the end transmitter 12, the ground waves arriving at each antenna are exactly 180° out of phase and, as a result, these signals are effectively added together by the phasing unit to produce maximum signal amplitudes across terminals 23e and 23f as indicated by the corresponding points on the curve 36.

The dotted line curve 38 shown in Fig. 7 represents the amplitude of the sky wave signals appearing across terminals 23e and 23f as a function of the spacing between antennas 17 and 18. The ordinate of this curve is identical to that for the ground wave curve 36 and, accordingly, points on the two curves 36 and 38 in horizontal alignment represent signals of equal amplitude applied to the reference receiver 11a. It should be observed that in the construction of the curve 38, the assumption has again been made that the antennas 17 and 18 are aligned with respect to the end transmitter 12. It has been further assumed that the angle of arrival of the sky waves at the antennas is equal to approximately 78°, although, as previously mentioned, this angle actually depends upon the height of the reflecting layer as well as the distance between the reference receiver 11a and the end transmitter 12 and, accordingly, the shape of the curve 38 will vary to some extent with variations in either of these factors.

The sky wave curve 38 is characterized by complete elimination of the sky wave signals when the antennas are spaced apart a distance corresponding to 4.83 wave lengths of the signal radiated by the end transmitter 12 since, with this antenna spacing, the sky waves arrive at the antennas 17 and 18 in phase coincidence and are cancelled by the phasing unit in the manner described above. The sky wave curve 38 reaches a maximum when the antennas are spaced approximately 2.42 wave lengths apart since, with this spacing, they are exactly 180° out of phase upon arrival at the antennas 17 and 18 and are effectively added together by the phasing unit 23.

The ratio between the ground wave and sky signals with various antenna spacings is represented in Fig. 7 by the broken line curve 39 and is obtained by determining the quotient between points in vertical alignment on the curves 36 and 38. From an analysis of the ratio curve 39, it will be apparent that large ground to sky wave ratios are obtained for antenna spacings in two distinct curve regions, these being for spacings of less than one wave length and for spacings in the vicinity of four and one-half wave lengths. Since, for the reasons discussed previously, spacings in the latter region in many installations are too large for practical purposes, it is desirable in such cases to select a spacing falling within the former region. It will be recalled that spacings of less than one-sixth wave length are also impractical due to the fact that the ground wave signals corresponding to these spacings are of insufficient amplitude to afford proper operation of the reference receiver 11a even though the ground to sky wave ratio is relatively high. Therefore, a spacing of one-sixth wave length between antennas provides optimum results, in that a relatively high ground wave to sky wave ratio is obtained while, at the same time, ground wave signals are produced having an amplitude sufficient to drive the reference receiver 11a. If the antennas 17 and 18 are spaced apart by this distance, the ground wave signals received from the end transmitter 12 are displaced in phase by $\pi/3$ and sky wave interference at the reference receiver 11a is minimized due to the high ground to sky wave ratio.

As indicated above, a phase displacement of $\pi/3$ between ground wave signals would be obtained by spacing the antennas 17 and 18 one-sixth wave length apart only if these antennas are aligned with respect to the end transmitter 12. However, in the system shown in Fig. 1 the base line 19 along which the antennas are located does not pass through the position of the end transmitter 12 and, accordingly, in order to obtain a phase displacement of $\pi/3$ a spacing slightly in excess of one-sixth wave length will be necessary. The following relationship may be employed to compute the proper spacing between the antennas for any desired phase displacement between ground wave signals:

$$x = \frac{d}{\lambda} \cos A \qquad (3)$$

in which $x$, as indicated above, represents the phase displacement between ground wave signals on the two antennas; $d$ represents the distance between antennas; $\lambda$ represents the wave length of the received signals; and A represents the angle formed by the base line 19 with an imaginary line (not shown) interconnecting the end transmitter 12 with the location of the antennas 17 and 18. Applying Equation 3 to the particular system described above wherein a phase displacement of $\pi/3$ between ground wave signals has been shown to produce optimum results, it will be seen that such a phase displacement may be obtained by separating the antennas by the following distance:

$$d = \frac{\pi \lambda}{3 \cos A} \qquad (4)$$

Turning now to a description of the manner in which sky waves arriving at the antennas 17 and 18 from the center transmitter 10 are minimized, it will be recalled that in the system shown in Fig. 1 the base line 19 bisects the base line 20 interconnecting the transmitters 10 and 12. It will be recognized that the phase displacement between the ground waves from transmitter 10 is a function of the frequency of the waves, the separation between antennas, and the magnitude of the angle formed between the base line 19 and an imaginary line extending between the transmitter 10 and the antennas. The latter angle is approximately equal to the angle formed by the base line 19 and a line extending from the end transmitter 12 to the antennas. Moreover, the frequencies of the signals radiated by the transmitters 10 and 12 are nearly equal with the result that a spacing between the antennas to provide a phase displacement of $\pi/3$ for the ground wave signals received from the end transmitter 12 will provide approximately the same phase displacement for the ground wave signals received from the center transmitter 10. Obviously, the signals received from the center transmitter 10 will be combined in the phasing unit 23 in exactly the same manner as described above for the signals from the end transmitter 12. The sky wave signals from transmitter 10 arrive at an angle which is dependent upon the distance between their source and the point of location of the antennas and, accordingly, this angle will be somewhat different from the angle of arrival of the sky waves from the end transmitter. However, the sky wave problem due to waves arriving from the transmitter 10 is not nearly as acute as that presented by arrival of sky waves from the transmitter 12 since, as previously mentioned, the antennas 17 and 18 are located much closer to the center transmitter 10. Thus, when the antennas are spaced apart to produce a phase displacement of approximately $\pi/3$ for the ground waves radiated from the transmitter 12, sky waves from the latter transmitter are minimized while the phasing unit still provides a relatively large ratio between the amplitudes of the ground and sky waves received from the transmitter 10. As a result, the effect of sky wave interference from the transmitter 12 at the reference receiver 11a is minimized while, at the same time, the sky waves arriving from transmitter 10 are reduced.

In like manner, the antennas 17' and 18' associated with the reference receiver 12a are spaced apart a distance sufficient to provide a phase displacement of approximately $\pi/3$ for the ground wave signals received from both of the transmitters 10 and 11 in order to minimize sky wave interference, and, since these antennas are located equal distances from the end transmitter 12, interference of the carrier wave radiated by that transmitter is prevented.

At this time, it should be observed that, while an antenna separation to produce a phase displacement of $\pi/3$ between received ground wave signals has been shown to produce optimum results in the system described above, a different antenna spacing may be required in other installations. Thus, as previously described, the proper antenna separation is dependent upon a number of system conditions among which are the spacing between the three transmitters, the height of the layer reflecting the sky wave signals, the alignment of the antennas with respect to the three transmitters, and the frequencies of the transmitters.

Figure 2:

For any particular system, the proper antenna spacing may be determined by considering each of these factors in accordance with the preceding description. Therefore, it will be apparent that the use of the facilities described above for minimizing interference problems at the receiving equipment is not limited to the system shown in Fig. 1 inasmuch as these facilities will achieve the same results in any system employing a reference receiver located adjacent a link transmitter. For example, referring now to Fig. 2, the present invention is there illustrated as embodied in a three foci hyperbolic continuous wave transmitting system employing three spaced continuous wave transmitters 110, 111 and 112 and a link transmitting station 116 including a transmitter 114 for providing position indications an any number of mobile receiver units 113. The transmitting and receiving system illustrated in Fig. 2 is disclosed and claimed in United States Patent No. 2,513,316 to James E. Hawkins, assigned to the same assignee of the present invention, and, accordingly, a detailed description of this system will not be recited herein. Briefly, however, the transmitters 110, 111 and 112 each radiates continuously as unmodulated position indicating signal of radio frequency, the frequencies of the three waves being separated one from the other by only a small audio frequency difference. The carrier waves radiated from all three of these transmitters are collected by receiving apparatus 115 at the link transmitting station 116 where they are heterodyned in pairs to provide a plurality of beat frequency signals. The beat frequency between the ground waves radiated by the transmitters 110 and 111 and the beat frequency between the ground waves radiated by the transmitters 110 and 112 are both developed by the receiving apparatus 115 and both employed as reference signals for modulating the carrier wave radiated by the link transmitter 114.

At the mobile receiving unit 113 the three unmodulated waves radiated from the transmitters 110, 111 and 112 are received together with the modulated carrier wave radiated by the link transmitter 114. The two reference signals appearing on the latter wave are reproduced and separated by suitable filtering equipment. At the same time the mobile receiving unit functions to heterodyne the position indicating signal radiated by the transmitter 110 with that radiated by the transmitter 111 to produce a first beat frequency signal having a frequency equal to that of a first of the reproduced reference signals. The position indicating signal radiated from the transmitter 110 is also heterodyned with that radiated from the transmitter 112 in order to develop a second beat frequency signal having a frequency equal to that of the second of the reference signals. The phase relationship between the first beat frequency signal and the first reference signal is determined in order to provide an indication of the location of the mobile receiving unit along a hyperbolic isophase line having its foci at the transmitters 110 and 111. A measurement of the phase relationship between the second beat frequency signal and the second reference signal provides an indication of the location of the mobile receiver unit along a hyperbolic isophase line having its foci at the transmitters 110 and 112. The intersection of the two identified isophase lines provides a position fix and effects an absolute determination of the location of the mobile receiver unit 113 provided, of course, that the cyclic ambiguity of the system is resolved by any means known in the art.

From the foregoing description, it is apparent that the reference receiver 115 is operated at a point closely adjacent the link transmitter 114 and intercepts the ground waves radiated by all of the transmitters 110, 111 and 112 as well as any sky waves appearing at the reference receiver as a result of these radiations. For the purpose of eliminating sky wave interference and for permitting operation of the reference receiver 115 in proximity to the link transmitter 114 without incurring the adverse effects of the carrier wave radiation from the latter transmitter, equipment identical to that shown in Figs. 3 and 4 is associated with the reference receiver. Thus, as shown in Fig. 2, a pair of spaced vertical antennas 117 and 118 are located a relatively short distance from the reference receiver 115 and have their output terminals connected through a transmission line 126 to the signal input terminals of the receiver. These two antennas are aligned along an imaginary base line, indicated at 119, and are positioned at some distance from the source of the waves radiated by the link transmitter 114. For the reasons discussed above, the antennas 117 and 118 need not be located equal distances from the link transmitter 114. The antennas are preferably oriented within the radiation field of the spaced transmitters so that the base line 119 intersects an imaginary base line 120 interconnecting the points of location of the transmitters 110 and 111 at a point intermediate these two transmitters and also intersects an imaginary base line 121 interconnecting the transmitters 110 and 112 at a point between these two transmitters. The reference receiver 115 is positioned relatively close to the center transmitter 110 and, as a result, no sky waves appear at the antennas 117 and 118 as a result of radiation from this transmitter. The equipment associated with the antennas 117 and 118, as indicated above, is identical to that shown in Figs. 3 and 4 and includes a bridge type phasing unit which is balanced to eliminate the carrier wave radiated by the link transmitter 114 and, hence, to prevent its application to the signal input terminals of the reference receiver. The antennas 117 and 118 are spaced apart by a distance necessary to provide a relatively large ratio between the ground wave and sky wave signals while at the same time furnishing ground wave signals of sufficient amplitude to excite the signal input terminals of the reference receiver. As previously described, the proper spacing to effect these desirable results will depend upon the particular system conditions encountered but may be determined in the manner recited above.

While the apparatus of the present invention has been shown and described as used in a radio position finding system of the type requiring operation of a reference receiver adjacent a link transmitter, it should be understood that the invention is not limited to use in this particular environment. Thus, the apparatus could be employed in any radio position finding system including spaced apart transmitters and requiring the operation of a receiver adjacent one of the transmitters. In certain systems heretofore proposed a receiver has been employed to develop a signal for controlling the frequency of the adjacent transmitter. In these systems, the signal developed by the receiver is never applied as a modulation component for space radiation. However, in the event that sky wave interference or receiver blocking problems are encountered in these systems the antenna array and bridge circuit described above may be employed.

From the foregoing description, it is apparent that the two spaced vertical antennas and the described equipment associated therewith may be employed in any system of the type requiring the transmission of position indicating signals from spaced transmitters with a receiver operated adjacent one of the transmitters without incurring problems incident to the reception of high power waves from the adjacent transmitter and also without incurring sky wave interference from the remote transmitter or transmitters.

While particular embodiments of the invention have been shown, it will be understood, of course, that the invention is not limited thereto since many modifications may be made and it is therefore contemplated by the appended claims to cover any such modifications as fall within the true spirit and scope of the invention.

What is claimed as new and desired to be secured by Letters Patent of the United States is:

1. In a position determining system of the type requiring the transmission of position indicating signals from spaced transmitters and the transmission of a reference signal as a modulation component, the combination of at least a pair of spaced apart transmitting units for radiating waves of different frequencies, means adjacent one of said units including receiver means for receiving at least one ground wave radiated from another of said units and for developing therefrom a reference signal, means for modulating said reference signal upon a carrier wave radiated from said one unit, and means for preventing interference of both said carrier wave and the sky wave resulting from radiation of said one wave with said receiver means, said last named means including at least two spaced receptors each receiving said carrier wave and said ground and sky waves, and a bridge circuit excited by the signals from each receptor and balanced to said carrier wave.

2. In a position determining system of the type requiring the transmission of position indicating signals from spaced transmitter and the transmission of a reference signal as a modulation component, the combination of at least a pair of spaced apart transmitting units for radiating waves of different frequencies, means adjacent one of said units including receiver means for receiving at least one ground wave radiated from another of said units and for developing therefrom a reference signal, means for modulating said reference signal upon a carrier wave radiated from said one unit, and means for preventing interference of said carrier wave and the sky wave resulting from radiation of said one wave with said receiver means, said last named means including at least two spaced receptors for receiving said carrier wave, and a bridge circuit responsive to the signals from each of said receptors, said bridge circuit including a plurality of interconnected impedances at least one of which is adjustable to enable the bridge circuit to be balanced to said carrier wave in order to eliminate the carrier wave.

3. In a position determining system of the type requiring the transmission of position indicating signals from spaced transmitters and the transmission of a reference signal as a modulation component, the combination of at least a pair of spaced apart transmitting units for radiating waves of different frequencies, means adjacent one of said units including receiver means for receiving at least one ground wave radiated from another of said units and for developing therefrom a reference signal, means for modulating said reference signal upon a carrier wave radiated from said one unit, a pair of spaced receptors associated with said receiver means each responsive to said carrier wave and to the ground and sky waves resulting from radiation of said one wave, each of said receptors reproducing a received signal due to said carrier wave, and means including a bridge circuit balanced to said carrier wave for eliminating said carrier wave and for effectively preventing interference by said sky wave with said receiver means while passing the signals producing said reference signal to the receiver means.

4. In a position determining system of the type requiring the transmission of position indicating signals from spaced transmitters and the transmission of a reference signal as a modulation component, the combination of at least a pair of spaced apart transmitting units for radiating waves of different frequencies, means adjacent one of said units including receiver means for receiving at least one ground wave radiated from another of said units and for developing therefrom a reference signal, means for modulating said reference signal upon a carrier wave radiated from said one unit, a pair of spaced receptors associated with said receiver means each responsive to said carrier wave and each reproducing a received signal due to said carrier wave, and means including a bridge circuit balanced to said carrier wave but not to the signals producing said reference signal for elimiminating said carrier wave from the input of said receiver means and for effectively preventing the sky wave resulting from the radiation of said one wave from interfering with said receiving means, said bridge circuit having at least one adjustable impedance for balancing the bridge to eliminate said carrier wave.

5. In a position determining system of the type requiring the transmission of position indicating signals from spaced transmitters and the transmission of a reference signal as a modulation component, the combination of at least three spaced apart transmitting units for radiating waves of different frequencies, means adjacent one of said units including receiver means for receiving at least one ground wave radiated from each of the other units and for developing therefrom at least one reference signal, means for modulating a carrier wave radiated by said one unit with said reference signal, and means associated with said receiver means for eliminating the sky waves resulting from the radiation of waves by said other units while at the same time preventing interference of said carrier wave with said receiver means, said last named means including at least two spaced receptors for receiving both the ground and sky waves from said other units together with said carrier wave, said receptors being spaced apart a predetermined distance whereby the sky waves intercepting each of said receptors are displaced in phase by a preselected amount, and a bridge circuit jointly responsive to the signals from both of said receptors, said bridge circuit including an adjustable arm for balancing the bridge to eliminate both the carrier wave and the sky waves, thereby preventing their application to the receiver means.

6. In a position determining system of the type requiring the transmission of position indicating signals from spaced transmitters and the transmission of a reference signal as a modulation component, the combination of at least a pair of spaced apart transmitting units for radiating waves of different frequencies, means adjacent one of said units including receiver means for receiving at least one wave radiated from another of said units and for developing therefrom a reference signal, means for modulating said reference signal upon a carrier wave radiated from said one unit, a pair of spaced receptors associated with said receiver means each responsive to said carrier wave and each reproducing a received signal due to said carrier wave, and means including a four terminal bridge circuit responsive to said received signals for eliminating said carrier wave from the input of said receiver means, said bridge circuit having a pair of opposed input terminals respectively excited by the received signals from said receptors, a pair of opposed output terminals for supplying signals to said receiver means and a pair of adjustable arms for balancing the bridge to eliminate said carrier wave.

7. In a position determining system of the type requiring the transmission of position indicating signals from spaced transmitters and the transmission of a reference signal as a modulation component, the combination of at least three spaced apart transmitting units for radiating waves of different frequencies, means adjacent one of said units including receiver means for receiving at least one ground wave radiated from each of the other units and for developing therefrom at least one reference signal, means for modulating a carrier wave radiated by said one unit with said reference signal, and means associated with said receiver means for eliminating the sky waves resulting from the radiation of waves by said other units while at the same time preventing interference of said carrier wave with said receiver means, said last named means including at least two spaced receptors for receiving both the ground and sky waves from said other units together with said carrier wave, said receptors being spaced apart a predetermined distance whereby the sky waves intercepting each of said receptors are displaced in phase by a preselected amount, and a four terminal bridge circuit having a pair of opposed input terminals respectively excited by signals from said receptors, a pair of opposed output terminals developing signals for application to said receiver means, and a pair of adjustable arms to balance the bridge and eliminate both the carrier wave and the sky waves, thereby preventing their application to the receiver means.

8. In a position determining system of the type requiring the transmission of position indicating signals from spaced transmitters and the transmission of a reference signal as a modulation component, the combination of at least three spaced apart transmitting units for radiating waves of different frequencies, means adjacent one of said units including receiver means for receiving at least one ground wave radiated from each of the other units and for developing therefrom at least one reference signal, means for modulating a carrier wave radiated by said one unit with said reference signal, and means associated with said receiver means for eliminating the sky waves resulting from the radiation of waves by said other units while at the same time preventing interference of said carrier wave with said receiver means, said last named means including a pair of vertical antennas spaced apart at such distance that said sky waves intercept said antennas at a predetermined angle whereby the sky waves appearing at each of said antennas are displaced in phase, and a four terminal bridge circuit for balancing out and eliminating said sky waves and said carrier wave while passing said ground waves to the receiver means, said bridge circuit having opposed input terminals respectively excited by the signals from said receptors, opposed output terminals developing signals for application to said receiver means, a pair of fixed impedance arms and a pair of adjustable arms to balance the bridge in order to eliminate said carrier wave and said sky wave.

9. In a position determining system of the type requiring the transmission of position indicating signals from spaced transmitters and the transmission of a reference signal as a modulation component, the combination of at least a pair of spaced apart transmitting units for radiating waves of different frequencies, means adjacent one of said units including receiver means for receiving at least one ground wave radiated from another of said units and for developing therefrom at least one reference signal, means for modulating a carrier wave radiated by said one unit with said reference signal and means associated with said receiver means for minimizing the effect of the sky waves resulting from the radiation of waves by said other unit while at the same time preventing interference of said carrier wave with said receiver means, said last named means including at least two receptors spaced apart in the direction of travel of the ground waves radiated from said other unit whereby the ground waves and sky waves intercepted by each of said receptors are displaced in phase by different amounts, the spacing between said antennas being sufficient to produce a phase displacement of approximately sixty degrees between the ground waves received at the two antennas from said other unit, and a bridge circuit jointly responsive to the signals from both of said receptors for minimizing the effect of the sky waves and cancelling said carrier wave.

10. In a position determining system of the type requiring the transmission of position indicating signals from spaced transmitters and the transmission of a reference signal as a modulation component, the combination of at least a pair of spaced apart transmitting units for radiating waves of different frequencies, means adjacent one of said units including receiver means for receiving at least one ground wave radiated from another of said units and for developing therefrom at least one reference signal, means for modulating a carrier wave radiated by said one unit with said reference signal, and means associated with said receiver means for minimizing the effect of the sky waves resulting from the radiation of waves by said other unit while at the same time preventing interference of said carrier wave with said receiver means, said last named means including a pair of vertical antennas spaced apart in the direction of travel of the ground waves radiated from said other unit whereby the sky waves and ground waves intercepting said antennas are displaced in phase by different amounts, the spacing between said antennas being sufficient to produce a phase displacement of approximately sixty degrees between the ground waves received at the two antennas from said other unit, and a four terminal bridge circuit responsive to the signals from both of said antennas for balancing out and eliminating said carrier wave and minimizing said sky waves without attenuating the ground waves, said bridge circuit having a first pair of opposed input terminals respectively excited by the signals from said receptors and a second pair of opposed output terminals developing signals for application to said receiver means.

11. In a position determining system of the type requiring the transmission of position indicating signals from spaced transmitters and the transmission of a reference signal as a modulation component, the combination of at least a pair of spaced apart transmitting units for radiating waves of different frequencies, means adjacent one of said units including receiver means for receiving at least one ground wave radiated from another of said units and for developing therefrom at least one reference signal, means for modulating a carrier wave radiated by said one unit with said reference signal, and means associated with said receiver means for minimizing the effect of the sky waves resulting from the radiation of waves by said other unit while at the same time preventing interference of said carrier wave with said receiver means, said last named means including a pair of vertical antennas spaced apart in the direction of travel of the ground waves radiated from said other unit whereby the ground waves and the sky waves appearing at each of said antennas are displaced in phase by different amounts, the spacing between said antennas being sufficient to produce a phase displacement of approximately sixty degrees between the ground waves received at the two antennas from said other unit, and a four terminal bridge circuit for balancing out and eliminating said carrier wave and minimizing said sky waves while passing said ground waves to the receiver means, said bridge circuit including a pair of opposed input terminals respectively excited by the signals from said receptors, a pair of opposed output terminals developing signals for application to the receiver means, a pair of fixed impedance arms and a pair of adjustable arms for balancing the bridge to eliminate said carrier wave.

12. In a radio position finding system, the combination of at least two spaced apart transmitters respectively radiating first and second signals, a receiver adapted to be operated adjacent the first of said transmitters and adapted to be responsive to the ground wave signal from said second transmitter, a pair of spaced apart receptors each receiving the signals radiated from said first transmitter as well as both the ground and sky wave signals radiated from said second transmitter, and a bridge circuit jointly responsive to all of the signals received by each of said spaced receptors, said bridge circuit being balanced to the signal from said first transmitter and being effective to attenuate the sky wave signal from said second transmitter while passing the ground wave signal from said second transmitter to said receiver.

13. In a radio position finding system, the combination of at least two spaced apart transmitters respectively radiating first and second signals, a receiver adapted to be operated adjacent the first of said transmitters and adapted to be responsive to the ground wave signal from said second transmitter, and means including a bridge circuit at the input of said receiver for attenuating the signal received from said first transmitter and the sky wave signal received from said second transmitter while passing the ground wave signal received from said second transmitter to said receiver.

14. In a radio position finding system, the combination of at least two spaced apart transmitters respectively radiating first and second signals, a receiver adapted to be operated adjacent the first of said transmitters and adapted to be responsive to the ground wave signal from said second transmitter, a pair of receptors spaced apart generally in the direction of travel of the ground waves arriving from said second transmitter by a predetermined amount and each receptor being responsive to the signals received from said first transmitter and to both the ground and sky wave signals received from said second transmitter, the antenna spacing being such that the phase displacement between the ground wave signals arriving at the antennas from the second transmitter is different from the phase displacement between the sky wave signals arriving at the antennas from the second transmitter, and a bridge circuit jointly responsive to the phase of signals appearing on said receptors, said bridge circuit being balanced to the signal from said first transmitter and being effective to attentuate the sky wave signal from said second transmitter while passing the ground wave signal from said second transmitter to said receiver.

15. In a radio position finding system, the combination of at least two spaced apart transmitters respectively radiating first and second signals, a receiver adapted to be operated adjacent the first of said transmitters and adapted to be responsive to the ground wave signal from said second transmitter, and means associated with said receiver for attenuating the sky wave signal received from said second transmitter, said last named means including a pair of vertical antennas spaced apart in the general direction of travel of the ground waves received from said second transmitter, whereby the phase displacement between the sky wave signals appearing on the antennas from the second transmitter is different from the phase displacement between the ground wave signals appearing on the antennas from the second transmitter, and a bridge circuit responsive to the phase of the signals received by said antennas for attenuating the sky waves received from said second transmitter.

16. In a radio position finding system, the combination of at least two spaced apart transmitters respectively radiating first and second signals, a receiver adapted to be operated adjacent the first of said transmitters and adapted to be responsive to the ground wave signal from said second transmitter, and means associated with said receiver for attenuating the sky wave signal received from said second transmitter, said last named means including a pair of vertical antennas spaced apart in the general direction of travel of the ground waves received from said second transmitter by a distance sufficient to produce a phase displacement of approximately sixty degrees between the ground wave signal received at the antennas from said second transmitter, and a bridge circuit connected to the input of said receiver and responsive to the phase of the signals received by said antennas for attenuating the sky waves received from said second transmitter.

17. In a radio position finding system, the combination of at least two spaced apart transmitters respectively radiating first and second signals, a receiver adapted to be operated adjacent the first of said transmitters and adapted to be responsive to the ground wave signal from said second transmitter, a pair of spaced apart receptors each receiving the signals radiated from said first transmitter as well as both the ground and sky wave signals radiated from said second transmitter, and a bridge circuit jointly responsive to all of the signals received by each of said spaced receptors for attenuating the sky wave signal from said second transmitter while passing the ground wave signal from said second transmitter to said receiver.

18. In a radio position finding system, the combination of at least two spaced apart transmitters respectively radiating first and second signals, a receiver adapted to be operated adjacent the first of said transmitters and adapted to be responsive to the ground wave signal from said second transmitter, a pair of spaced vertical antennas receiving both the ground and sky wave signals from said second transmitter, and a bridge circuit connected to the input of said receiver, for attenuating the sky wave signal received from said second transmitter while passing the ground wave signal received by said second transmitter to said receiver.

References Cited in the file of this patent

UNITED STATES PATENTS

| | | |
|---|---|---|
| 767,970 | Stone | Aug. 16, 1904 |
| 767,980 | Stone | Aug. 16, 1904 |
| 1,468,060 | Weagant | Sept. 18, 1923 |
| 2,504,573 | O'Brien | Apr. 18, 1950 |
| 2,513,317 | Hawkins | July 4, 1950 |